United States Patent
Granstrom et al.

(10) Patent No.: US 7,031,109 B1
(45) Date of Patent: Apr. 18, 2006

(54) SEMICONDUCTOR MATERIALS USED IN MAGNETIC RECORDING HEAD ASSEMBLIES TO PREVENT DAMAGE FROM ELECTROSTATIC DISCHARGE

(75) Inventors: Eric Leroy Granstrom, Golden Valley, MN (US); Ned Tabat, Chanhassen, MN (US); Cyril Peter De Vries, Bloomington, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 124 days.

(21) Appl. No.: 10/317,598

(22) Filed: Dec. 11, 2002

(51) Int. Cl.
*G11B 5/147* (2006.01)
(52) U.S. Cl. ........................ 360/126; 360/317
(58) Field of Classification Search ............... 360/323, 360/128, 126
See application file for complete search history.

(56) References Cited

U.S. PATENT DOCUMENTS

| | | | |
|---|---|---|---|
| 5,644,454 A | 7/1997 | Arya et al. | |
| 5,742,452 A * | 4/1998 | Simmons et al. | 360/246.1 |
| 5,963,415 A | 10/1999 | Johansen | |
| 6,259,573 B1 | 7/2001 | Tsuwako et al. | |
| 6,342,311 B1 | 1/2002 | Inturi et al. | |
| 6,721,140 B1 * | 4/2004 | Inoue et al. | 360/323 |

* cited by examiner

Primary Examiner—Robert S. Tupper

(57) ABSTRACT

The invention includes a magnetic recording head that has at least one structure or substructure that is made of a semiconductor material that protects the head from damage or destruction arising from stray current flow or unwanted electrostatic discharge during manufacture, assembly or use. The semiconductor material acts as a dissipative pathway to drain unwanted charges from the structure. The invention also includes a magnetic recording head that includes a substrate and a reader portion in the substrate, the substrate comprising a semiconductor material.

23 Claims, 2 Drawing Sheets

SEMICONDUCTOR MATERIALS USED IN MAGNETIC RECORDING HEAD ASSEMBLIES TO PREVENT DAMAGE FROM ELECTROSTATIC DISCHARGE

FIELD OF THE INVENTION

This invention relates generally to a magnetic recording head protected from damage or destruction arising from stray current flow or unwanted electrostatic discharge during manufacture, assembly or use. More specifically, the invention relates to magnetic recording heads using a novel harmful charge dissipative structure having a resistivity (conductivity) appropriate to drain any built up excess charge but having a resistivity (conductivity) in a range that does not interfere with the operation of the head structure to read or write data from or to a recording medium.

BACKGROUND OF THE INVENTION

As the technology of magnetic data storage and retrieval matures, the demands on speed and accuracy of data transfer has reduced the size of constituent parts, increased magnetic flux, operating current, voltage and speed of operations resulting in an increased tendency of components to fail.

Magnetic read/write heads commonly used in high-density magnetic data storage devices provide both reading and writing capability. Such structures are often fabricated using modern production techniques beginning with chip fabrication. In such manufacturing techniques, substructures such as the read sensor and write magnetic components are fabricated into the chip in a closely associated fashion typically in the substrate material. The read/write components are integrated into the chip with a variety of substructures used to ensure that the read/write functions occur without interference, and that the read/write components can communicate with active components in the drive and ultimately the computing equipment. The writing capability places magnetic information on the surface of a recording medium, while the reading capability obtains information from magnetic domains in the recording medium created by the writing function. In both the reading and writing function, electrical components are formed using conventional fabrication techniques. At a minimum, these techniques obtain reading structures in the form of shielded sensors fabricated into insulating material. Similarly a writing structure typically comprises opposite magnetic poles defining the write gap. The read sensors and the magnetic polar structures are typically formed in insulating materials.

The tendency of insulating materials to acquire and hold static or electric charges, electric fields, etc., is well known. The resistivity of an insulator is typically at least about $10^{15}$ ohm-cm. The acquisition and discharge of built up charges on insulating surfaces including static charges can result in damage in a variety of electrical components, particularly those subject to damage from relatively high voltage. Like, many other micro scale structures, magneto resistive sensors in modern magnetic recording heads are susceptible to damage from discharge of stray electric charges, fields, and currents. Requirements for increasing area storage densities exacerbate this problem due to the decreasing size of head features increase magnetic flux and other increases in the demands of technology. Protection from electrostatic discharge (ESD) events in magnetic recording heads during head fabrication or production, drive assembly, installation and throughout customer use is therefore a large and growing concern.

Although ESD failures vary widely, this invention specifically addresses two important classes of ESD failure: dielectric breakdown and breakdown from charged device events. During various stages of magnetic recording head production, the head is exposed to high impedance charge sources that readily break down thin dielectrics (such as half gap dielectrics) while posing little risk to low resistance elements such as coils, poles, vias and the magnetic recording element itself. Additionally, damage to the read element itself may occur during downstream production if the product becomes charged. Since the slider body itself is isolated from the read element by layers of insulator, charge residing on the read element may be retained indefinitely, only to be quickly and destructively dissipated through the read element at the moment of contact to the reader or writer leads from any outside body.

We understand that conventionally ESD is prevented in some structures using conductive pathways. These structures and methods of using these structures, having a resistivity of less than $10^4$ ohm-cm, can provide some protection from the ESD. Such conductive structures are often unduly complicated to employ and cannot be used in all magnetic structures. We believe, however, that the use of generally conductive protection structures will not reliably achieve sufficient ESD protection in successful, productive manufacturing processing. A substantial need remains for the development of other methods of protecting a magnetic recording head from ESD. In particular a substantial need exists for the development of structures and methods of protecting magnetic recording heads from the ESD that utilize structures that dissipate static charges without interfering with read/write operations.

SUMMARY OF THE INVENTION

We have found that semiconductor materials used in the fabrication of structures and substructures in read, write, or read/write heads in magnetic recording devices can provide some protection to the head. The semiconductor material, in the read/write head structure or substructure, has a carefully selected resistivity (sufficient conductivity) to ensure that any excess charge buildup in the read, write, read/write head structure can be drained from the structure preventing unwanted discharge that can result in damage. The semiconductor material is used in the magnetic recording head in an appropriate location or locations such that the semiconductor drains desired charges from sensitive portions of the magnetic recording head. One or more of the various components, structures or substructures of the magnetic recording head can be fabricated from semiconductor materials. In the final design structure, sufficient semiconductor material should be placed within the magnetic recording head to ensure charge dissipation to prevent damage. The location of and the amount of semiconductor material used will depend to some degree on the design of the magnetic recording head. Preferred locations of the semiconductor materials are in either the base coat layer or in the first half gap substructure or in both. In one embodiment the semiconductor material is used in a first half gap substructure in a head having no base coat layer. The semiconductor material must provide a continuous pathway to obtain the removal of the unwanted charge from the reader device structure. Further, the semiconductor material is sufficiently insulative such that the proper operation of the reader/write head is not compromised through decreased signal strength, or increased noise coupling owing to parasitic shunting, capacitance, or other electrical phenomena. We have found that during various stages of magnetic recording head manufacture, beginning at wafer level, the structure can be exposed to high impedance electrical power sources (low current) that can readily break down thin dielectric materials (such as half gap dielectric materials) while posing little risk to low resistance elements in the head assembly. Additionally, in downstream assembly of the magnetic recording head assembly, damage resulting from sudden discharge of the accumulated electric charges can be prevented by charged dissipation through the semiconductor material. The use of semiconductor material to replace dielectric materials in the magnetic recording head structure provides the additional advantage of nonlinear resistivity. Such resistivity properties, at low electric field conditions (i.e. during drive operations) would dissipate charge without unwanted parasitic resistance comparable to the magnetic recording element structure itself. The dissipated semiconductor material needs to be resistant enough to prevent parasitic shunting of the sensor but not so resistant to prevent charge dissipation.

In accordance with one aspect of the invention, a magnetic recording head can be fabricated having at least one constituent structure or substructure that is made of a semiconductor material that is sufficiently conductive to act as a static charge dissipative material without interfering with read/write operations. In another aspect of the invention, the magnetic recording head can comprise a substructure such as a substrate, a basecoat layer, a reader portion having a bottom shield, a first half gap, a first insert, a second half gap, a second insert and a shared pole, a writer portion having a coil insulator, an overcoat layer or an isolation layer that can include an electrically dissipative semiconductor material. These substructures can be associated with a via that is made either of a semiconductor electrically dissipative material or conductor material.

In a further aspect of the invention, the magnetic recording head can comprise (1) a first half gap substructure or a basecoat layer or both comprising the semiconductor material, (2) a basecoat layer comprising the semiconductor material, or (3) a first half gap comprising the semiconductor material in the absence of a basecoat layer.

For the purpose of this disclosure, the term "head assembly or assemblies" refers to the structure of the magnetic head that can act as either a "read", a "write" or a "read/write" structure and any stage of manufacture or assembly from its constituent components including the semiconductor dissipative materials. In this disclosure, the term "sensor" refers to the structure that can "read" or detect magnetic domains on a magnetic recording surface. The term "magnetic recording element" refers to a magnetic structure configured to "write" or record data in magnetic domains on a magnetic recording surface. A "substructure" comprises any element of the head that is separately fabricated during manufacture.

An appropriate electrically dissipative material can be used to replace any one, or more than one, constituent structure or substructure within a magnetic recording head in a structure that has a capability of passing unwanted and accumulated electric charges from the recording head. A wide variety of electrically dissipative materials exist and can be used in devices of the invention, but the set of materials commonly known as semiconductors are a preferred example because they may be the easiest to integrate into a recording head without disruptive process implications. Semiconductor materials typically displaying resistivity is that range from about $10^9$ to about $10^{13}$ ohm-cm. Insulating materials typically exhibit resistivity of substantially higher values ($10^{15}$ ohm-cm) while conductive materials are much lower (less than $10^4$ ohm-cm) in resistivity. Examples of semiconductor materials include, but are not limited to, hydrogenated amorphous silicon, epitaxial silicon, polysilicon, microcrystalline silicon, and germanium.

By providing the electrically dissipative materials, such as semiconductor materials, which have lower resistances than conventional insulation or isolating structure materials, the magnetic recording head will generally be unable to accumulate or retain a potentially harmful charge when placed on any grounded metallic or dissipative surface during processing. This will serve to protect the head against damaging ESD discharge upon contact. Not only will introduction of the semiconductor materials allow for ESD protection, but can also obviate the need for other processing steps dedicated to the installation of alternative ESD protection schemes.

DETAILED DESCRIPTION OF THE INVENTION

A magnetic recording head 100 in accordance with one aspect of the invention has at least one isolating structure that is made of an electrically dissipative material.

Figure 1:
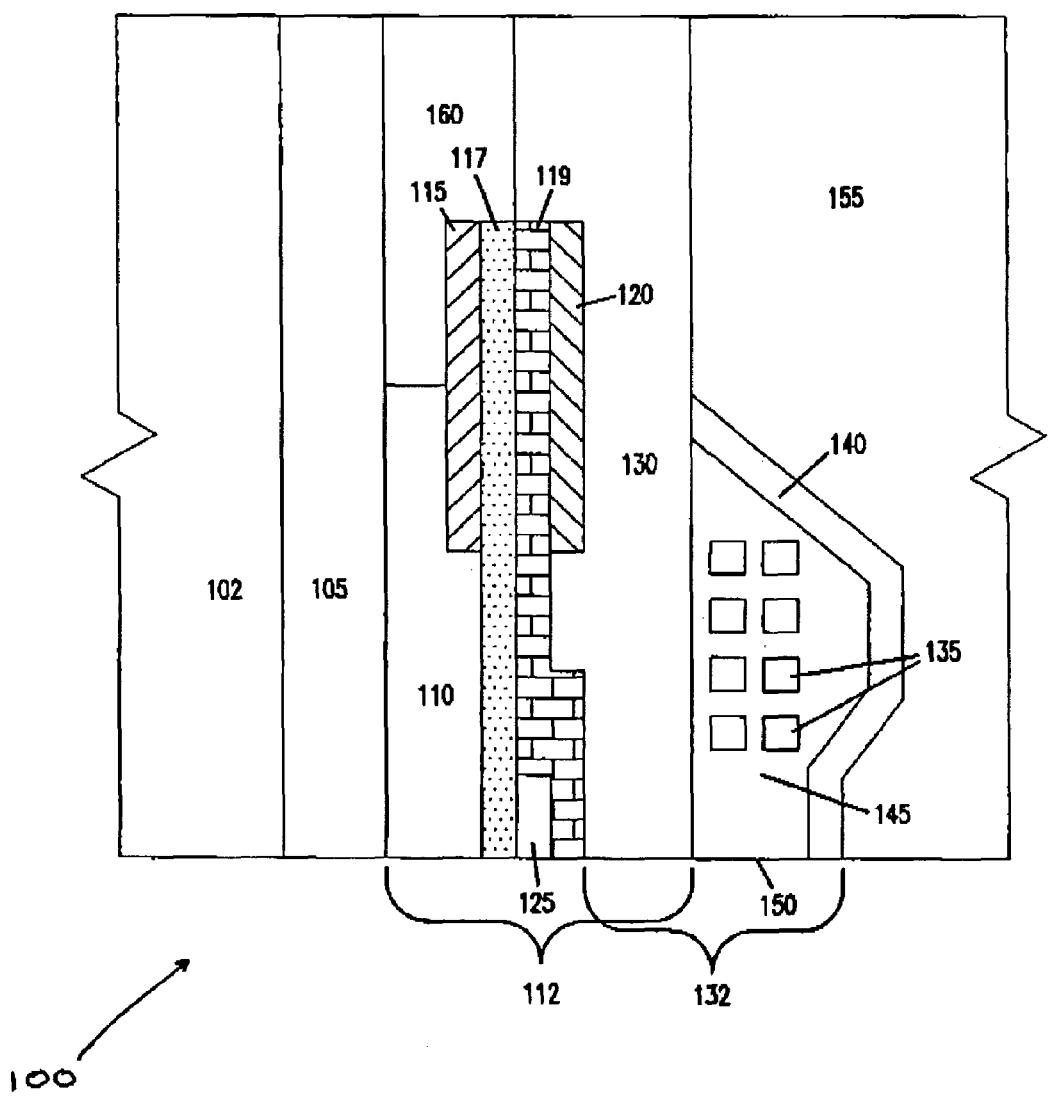
FIG. 1 is a cross-sectional view of a magnetic recording head in accordance with one embodiment of the invention head taken along a plane normal to an air-bearing surface of the magnetic recording head.

A magnetic recording head 100, illustrated in FIG. 1, includes substructures including a substrate 102, a basecoat layer 105, a reader portion 112, a writer portion 132, an overcoat layer 155, and an isolation layer 160. Magnetic recording heads 100 can also include structures that are not depicted in FIG. 1 and still be within the scope of the invention.

The substrate 102 generally functions to provide structural properties to the magnetic recording head 100 of the invention. The substrate 102 is generally made from any electrically insulating ceramic material including, but not limited to: a mixture of alumina oxide ($Al_2O_3$) and titanium carbide (TiC) referred to as AlTiC; or silicon (Si).

The basecoat layer 105 functions to electrically isolate the reader portion 112 from the substrate 102. The basecoat layer 105 is generally made from insulating materials such as aluminum oxide ($Al_2O_3$), aluminum nitride (AlN), silicon dioxide ($SiO_2$), silicon nitride ($Si_3N_4$), or of an electrically dissipative material. The electrically dissipative materials will be discussed in greater detail below.

The reader portion 112 includes the bottom shield 110, the first half gap 117, the first insert 115, the second half gap 119, the second insert 120, the read sensor 125, and the shared pole 130. The bottom shield 110 functions to magnetically shield the read sensor 125 from reading bits not directly adjacent to the sensor during readback operation. The bottom shield 110 is generally made from alloys of nickel (Ni), iron (Fe), and/or cobalt (Co).

The first half gap 117 and the second half gap 119 are isolating structures. Specifically, the first half gap 117 and the second half gap 119 function to electrically isolate the read sensor 125 from the bottom shield 110 and the shared pole 130. The first half gap 117, and the second half gap 119 may be made from insulating materials such as alumina oxide ($Al_2O_3$), alumina nitride (AlN), silicon dioxide ($SiO_2$), silicon nitride ($Si_3N_4$), or electrically dissipative material. The electrically dissipative materials will be discussed in greater detail below.

The first insert 115 and the second insert 120 are isolating structures. Specifically, the first insert 115 and the second insert 120, along with the first half gap 117 and the second half gap 119, function to electrically insulate the read sensor 125 from the bottom shield 110 and the shared pole 130. The first insert 115, and the second insert 120 may be made from insulating materials such as alumina oxide ($Al_2O_3$), alumina nitride (AlN), silicon dioxide ($SiO_2$), silicon nitride ($Si_3N_4$), or an electrically dissipative material. The electrically dissipative materials will be discussed in greater detail below.

The read sensor 125 functions to monitor changes in the magnetic polarity of portions of a magnetic storage media. The read sensor 125 is generally a giant magnetoresistive (GMR) sensor. The shared pole 130 functions as a top shield for the read sensor 125. The invention also encompasses magnetic recording heads in which the top shield for the read sensor 125 and a bottom pole for the writer portion 132 are separate structures instead of the same as they are in the shared pole 130. The shared pole 130 is generally made from alloys of nickel (Ni), iron (Fe), and/or cobalt (Co).

The writer portion 132 includes the shared pole 130, the writer coil 135, the top pole 140, the coil insulator 145, and the writer gap 150. The shared pole 130 functions as a bottom writer pole for the writer coil 135, which magnetically isolates the writer coil. As stated above, the shared pole 130 is generally made from alloys of nickel (Ni), iron (Fe), and/or cobalt (Co). The writer coil 135 functions to magnetize the top and bottom poles to form a magnetic field in the write gap 150 that can modify the magnetic characteristics of a magnetic storage media in order to record information thereon. The writer coil 135 is generally made from copper (Cu). The top writer pole 140 is generally made from alloys of nickel (Ni), iron (Fe), and/or cobalt (Co). The shared pole 130 and the top writer pole 140 form the writer gap 150, which is where the writer coils actually assert an effect on the magnetic storage media.

The coil insulator 145 is an isolating structure. The coil insulator 145 functions to electrically insulate one portion of the writer coil 135 from other portions of the writer coil 135 and from the poles 130 and 140. The coil insulator 145 may be made from insulating materials such as alumina oxide ($Al_2O_3$), alumina nitride (AlN), silicon dioxide ($SiO_2$), silicon nitride ($Si_3N_4$), or electrically dissipative material. The electrically dissipative materials will be discussed in greater detail below.

The overcoat layer 155 is an isolating structure. The overcoat layer 155 functions to electrically insulate the writer coil 135 and reader 125 from other conductive elements including elements not shown in FIG. 1. The overcoat layer 155 may be made from insulating materials such as alumina oxide ($Al_2O_3$), alumina nitride (AlN), silicon dioxide ($SiO_2$), silicon nitride ($Si_3N_4$), or an electrically dissipative material. The electrically dissipative materials will be discussed in greater detail below.

The isolation layer 160 is an isolating structure. The isolation layer 160 functions to electrically isolate the contacts to the reader 125 (not shown). The isolation layer 160 may be made from insulating materials such as alumina oxide ($Al_2O_3$), alumina nitride (AlN), silicon dioxide ($SiO_2$), silicon nitride ($Si_3N_4$), or an electrically dissipative material. The electrically dissipative materials will be discussed in greater detail below.

Magnetic recording heads 100 of the invention have at least one isolating structure that is made of an electrically dissipative material such as a semiconductor material. Therefore, magnetic recording heads 100 of the invention have at least one structure which functions to electrically isolate elements of the head enough to maintain electrical signal integrity, but also allows sufficient dissipation, which can prevent the accidental electrostatic charging of any conductor of the magnetic recording head 160 with respect to another conductor. The electrically isolating structure made of a semiconductor material can be the basecoat layer 105, the first half gap 115, the first insert 117, the second half gap 120, the second insert 119, the coil insulator 145, the overcoat layer 155, the isolation layer 160, or a combination thereof. Embodiments of the invention encompass a magnetic recording head 100 in which any one, or more than one of these isolating structures are made of an electrically dissipative material.

Figure 2:
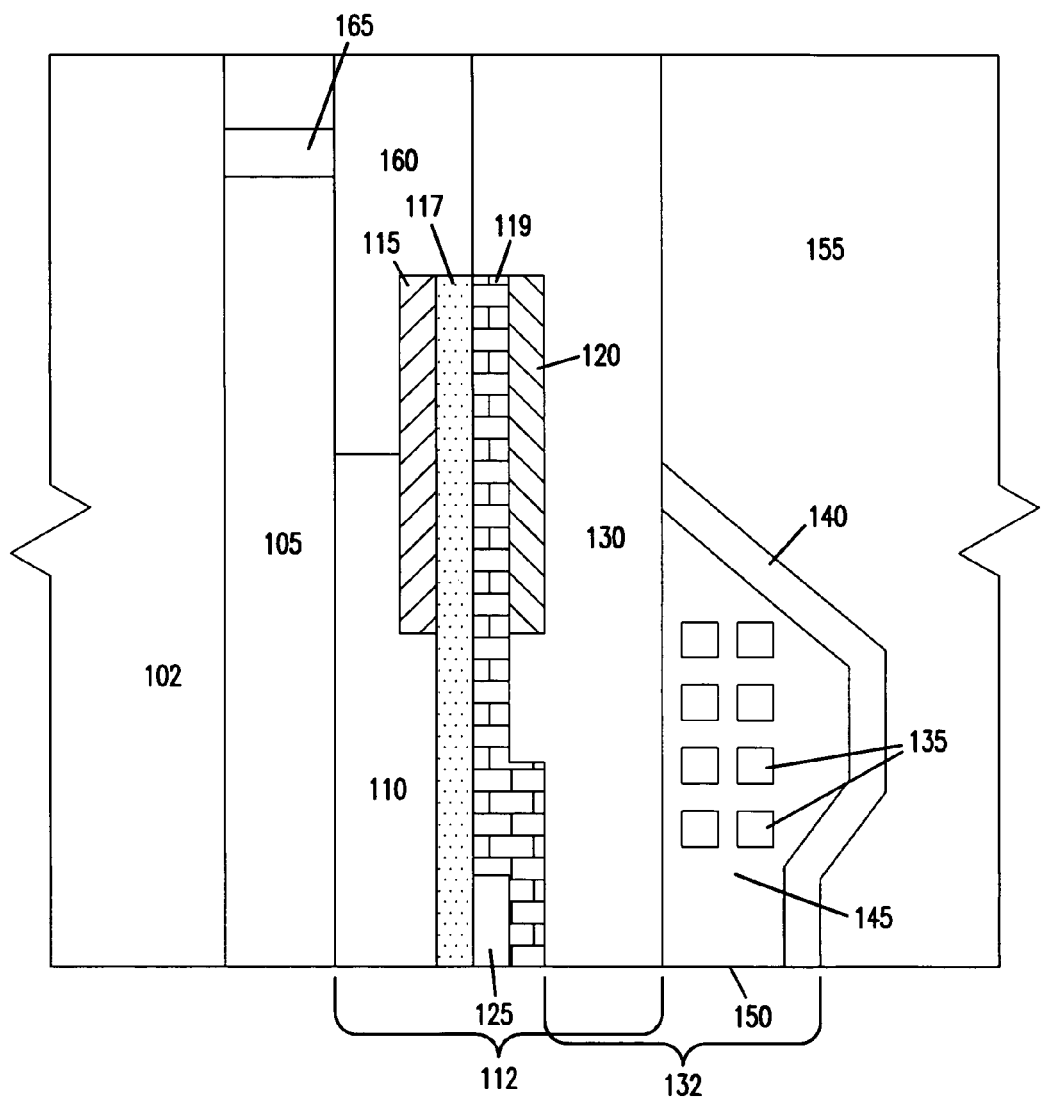
FIG. 2 is a cross-sectional view of a magnetic recording head in accordance with another embodiment of the invention including a metallic conductive via in the head structure, taken along a plane normal to an air-bearing surface of the magnetic recording head.

The invention also encompasses a magnetic recording head 100 with any one, or more than one of these isolating structures composed of an electrically dissipative material and an additional structure that aids in preventing ESD by providing a path for charge to dissipate. This structure is called a via 165, and is depicted in FIG. 2. Generally, the via 165 can be made of an electrically conductive material or an electrically dissipative material, including, but not limited to, copper (Cu) or semiconductor materials.

In one embodiment of the invention, the via 165 will generally be used to make contact between an isolating structure that is made of an electrically dissipative material and a structure that is relatively large and conductive. In one embodiment of the invention, the structure that is large and conductive is the substrate 102. In other embodiments of the invention, the structure that is large and conductive may be the reader 125, the contacts to the reader (not shown), the bottom shield 110, the shared pole 130, or the writer coils 135.

An example of an electrically dissipative material for use in the invention include, but is not limited to semiconductor materials. Semiconductor materials include any readily processed semiconductor material. A readily processed semiconductor material is one that can be processed using deposition and patterning techniques known to those of ordinary skill in the art. The deposition techniques include, but are not limited to physical vapor deposition (PVD), chemical vapor deposition (CVD), and plasma enhanced chemical vapor deposition (PECVD).

Specific examples of semiconductor materials include, but are not limited to, hydrogenated amorphous silicon (aSi:H), epitaxial silicon, polysilicon, microcrystalline silicon, and germanium. The specific semiconductor material used for a specific isolating structure may vary depending on a number of properties, including, but not limited to, resistivity, dielectric constant, structural, thermal, mechanical and chemical properties. It should be understood that some of the semiconductor materials may be preferentially utilized for construction of some of the isolating structures, whereas others may have more desirable properties for other isolating structures.

Semiconductor materials used for isolating structures should generally have a lower resistivity than materials commonly used for isolating structures. However, an infinitely low resistivity is also undesirable because the semiconductor material should be resistive enough to offer negligible parasitic shunting of the read sensor 125. Generally, semiconductor materials having resistivities in excess of about $10^8$ ohm-cm are preferred. Specifically, a semiconductor material used for either the first half gap 117 or the second half gap 119 would prevent electrical shorting of even just one side of the read sensor 125 to either the bottom shield 110 or the shared pole 130 respectively, as the bottom shield and shared pole are in many designs tied together electrically (not shown). When a short in either half gap is present, additional electrical noise is often observed in the electrical readback signal, destroying the performance of the head. The use of a semiconductor material protects against failure of the first or second half gap, and reduces the likelihood of developing such destructive shorts between the reader and either the bottom shield or shared pole.

As a specific example of a basis of choosing a semiconductor material that may be used for the first half gap 117 and/or the second half gap 119, existing specifications of magnetic recording heads can be considered. Isolation of 1 meg-ohm between reader and shield, when measured at 1V, is likely to satisfy both electrical isolation requirements as well as ESD dissipation requirements. Reported resistivities for undoped plasma enhanced chemical vapor deposition (PECVD) deposited aSi:H range widely from about $10^9$ to $10^{13}$ ohm-cm. Lower resistivity, doped aSi:H could also be used to offer even greater reader-to-shield ESD protection.

The semiconductor materials utilized in the invention also, preferably, have a resistivity that is non-linear. Using a semiconductor material with a non-linear resistivity may offer the advantage that, at low fields (i.e. during drive operation) the structure has an appropriate level of dissipative resistance, i.e., not so low as to offer parasitic resistance to the read sensor 125. However, at higher fields (i.e. during charging or an ESD event), additional non-destructive transport mechanisms are possible with a semiconductor material that generates lower differential resistivity. These different transport mechanisms allow for more effective shunting of the charge in order to prevent damage to the magnetic recording head 100.

The capacitance of the semiconductor materials used in the invention may also be considered. Stray capacitance between the electrically insulating structure and other structures may degrade head performance at high data rates. Semiconductor materials with low dielectric constants that range from about 5 to 10 are therefore preferred. Low dielectric constants are of particular importance when replacing either the first half gap 117 or the second half gap 119 so that changes in shield geometry are not necessary in order to maintain minimal capacitance.

Although the dielectric constant of aSi:H may be several times larger than that of materials commonly used for isolating structures, the overall structure of the magnetic recording head 100 may make this consideration irrelevant. Presently utilized magnetic recording head designs, appear to be limited in capacitance by the areas defined by the first insert 115 and the second insert 120, not the first half gap 117 and the second half gap 119. If the first insert 115 and the second insert 120 are made of materials commonly used in isolating structures, use of a semiconductor material for either the first half gap 117 or the second half gap 119 is not likely to significantly affect the signal from the read sensor 125, because the first insert 115 and the second insert 120 are the limiting factor.

The structural properties and processing capabilities of the semiconductor materials used may also need to be considered. Whether or not the semiconductor material can cover nonuniform wafer topography can be a concern in the deposition of many of the structures, and is of particular concern with respect to deposition of the second half gap 120. For each isolating structure, it is important that the elements above and below are well isolated, as the presence of sharp features below the isolating structure can pose a risk to the ability of an isolating structure to cover and isolate the two layers it separates. It is likely that semiconductors under appropriate processing conditions may offer equal, if not greater, coverage capability over materials commonly utilized in isolating structures. If the semiconductor materials do not show equal or greater ability to cover existing topography, use of a semiconductor material for only the first half gap 117 may generate less stringent structural requirements than use of a semiconductor material for both the first half gap 117 and the second half gap 119.

Another structural consideration relates to the deposition of the semiconductor materials, and deposition of structures on top thereof. The microstructure of structures that are grown atop the semiconductor material may be influenced by the semiconductor material. In some instances, effects on seeding and adhesion caused by the use of a semiconductor material may need to be considered.

The thermal properties of the semiconductor materials utilized in a magnetic recording head 100 of the invention may also be taken into account. A high thermal conductance in isolating structures is desired in order to obtain low temperature head operation. The values of thermal conductivities of many materials in thin film is poorly known, but semiconductors are likely to have thermal performances equal to, if not greater than, the materials commonly used in isolating structures.

The mechanical properties of the semiconductor materials may also need to be considered. During processing and operation of a magnetic recording head 100 of the invention, the materials of the first half gap 117 and the second half gap 119 should be able to withstand various levels of mechanical stress without failure. The thermal coefficient of expansion (CTE) of a semiconductor material may also be important. It is preferred that the CTE of the semiconductor material be close to that of adjacent layers in order to minimize stress on the multilayer head.

Chemical stability of the semiconductor materials may also be considered. Semiconductor materials should not be reactive with adjacent layers or the surrounding environment. Although these issues may be considered, they likely will not give rise to changes in general head performance or processing.

In preferred embodiments, the semiconductor material used during wafer build would be tailored to have the desired electrical properties for the particular application. For example, use of variable doping levels and deposition conditions could be used to address various concerns. Furthermore, use of different semiconductor materials may also allow purposeful tailoring of properties for use in specific isolating structures.

In one embodiment of the invention a semiconductor material is used for the first half gap 117. Replacement of only the first half gap 117 would offer some level of ESD protection. In another embodiment of the invention, aSi:H is used for the first half gap 117. Deposition of aSi:H can easily be accomplished with PECVD for example.

In another embodiment, a semiconductor material is used for the basecoat layer 105. In yet another embodiment aSi:H is used for the basecoat layer 105 of a magnetic recording head 100 that has the substrate 102 made of AlTiC. In even yet another embodiment, epitaxial silicon is used for the basecoat layer 105 of a magnetic recording head 100 that has the substrate 102 made of silicon.

In a further embodiment, the first half gap 117 is made of a semiconductor material and the basecoat layer 105 is either aSi:H (in the case of the substrate 102 being AlTiC), or epitaxial silicon (in the case of the substrate 102 being silicon). By making the basecoat layer 105 and the first half gap 117 of a semiconductor material, any charge at the read sensor 125 could then be capable of being bled to the substrate 102.

In yet another embodiment of the invention a semiconductor material is used in the coil insulator 145. In even another embodiment of the invention, a semiconductor material is used for the overcoat layer 155, the isolation layer 160, or both. In a further embodiment of the invention, at least one of the isolating structures is made of a semiconductor material, and an additional structure, for example a via 165, is provided that aids in ESD protection. In a specific embodiment, the via 165 is a copper plug that connects at least two different structures within the magnetic recording head 100. In another specific embodiment, the via 160 is made of a semiconductor material.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A magnetic recording head comprising:
   a substrate;
   a reader portion adjacent the substrate, the reader portion comprising a first half gap and a second half gap; and
   a writer portion;
   wherein the second half gap comprises a semiconductor material.

2. The magnetic recording head according to claim 1, further comprising a conductor.

3. The magnetic recording head according to claim 1, further comprising a basecoat layer that comprises a semiconductor material.

4. The magnetic recording head according to claim 1, wherein the first half gap comprises a semiconductor material.

5. The magnetic recording head according to claim 2, wherein the first half gap is proximate to the conductor.

6. The magnetic recording head according to claim 1, wherein the semiconductor material comprises at least one of hydrogenated amorphous silicon, epitaxial silicon, polysilicon, microcrystalline silicon, and germanium.

7. The magnetic recording head according to claim 1, wherein the semiconductor material has a dielectric constant about 5 to about 10.

8. The magnetic recording head according to claim 1, wherein the read structure further comprises a bottom shield and a shared pole.

9. A magnetic recording head comprising:
   a sensing portion comprising
      a read sensor having a first side and a second side, and
      a first semiconductor layer adjacent to the first side of the read sensor; and
   a writing portion;
   wherein the semiconductor layer dissipates electric charges that accumulate on the magnetic recording head.

10. The magnetic recording head according to claim 9, further comprising a conductor that aids in dissipating the electric charges.

11. The magnetic recording head according to claim 9, wherein the writing portion comprises a semiconductor material.

12. The magnetic recording head according to claim 9, wherein the sensing portion comprises a second semiconductor layer adjacent the second side of the read sensor.

13. The magnetic recording head according to claim 9, further comprising a basecoat layer that comprises a semiconductor material.

14. The magnetic recording head according to claim 13, further comprising an overcoat layer that includes a semiconductor material.

15. The magnetic recording bead according to claim 9, wherein the semiconductor material has a dielectric constant between about 5 to about 10.

16. The magnetic recording head according to claim 9, wherein the semiconductor layer comprises at least one of hydrogenated amorphous silicon, epitaxial silicon, polysilicon, microcrystalline silicon, and germanium.

17. The magnetic recording head according to claim 12, further comprising a basecoat layer that comprises a semiconductor material.

18. A magnetic recording head comprising:
   a substrate;
   a reading portion adjacent to the substrate, the reading portion comprising a first half gap and a second half gap; and
   a writing portion adjacent the reading portion;
   wherein the first half gap comprises a semiconductor material.

19. The magnetic recording head according to claim 18, wherein the semiconductor material comprises at least one of hydrogenated amorphous silicon, epitaxial silicon, polysilicon, microcrystalline silicon, and germanium.

20. The magnetic recording head according to claim 18, wherein the second half gap also comprises a semiconductor material.

21. The magnetic recording head according to claim 18, wherein the writing portion comprises a semiconductor material.

22. The magnetic recording head according to claim 18, further comprising a basecoat layer that comprises a semiconductor material.

23. The magnetic recording head according to claim 18, further comprising an overcoat layer that includes a semiconductor material.

* * * * *